(12) United States Patent
Bluteau

(10) Patent No.: US 7,232,519 B2
(45) Date of Patent: Jun. 19, 2007

(54) FISH TANK POWERHEAD MAGNETIC HOLDER

(76) Inventor: Philip Anthony Bluteau, 164 Second Ave., Albany, NY (US) 12202

( * ) Notice: Subject to any disclaimer, the term of this patent is extended or adjusted under 35 U.S.C. 154(b) by 156 days.

(21) Appl. No.: 10/907,265

(22) Filed: Mar. 26, 2005

(65) Prior Publication Data

US 2006/0086650 A1    Apr. 27, 2006

Related U.S. Application Data

(60) Provisional application No. 60/622,243, filed on Oct. 26, 2004.

(51) Int. Cl.
*A01K 63/04* (2006.01)
*C02F 1/74* (2006.01)

(52) U.S. Cl. .............. 210/167.21; 210/220; 210/416.2; 119/263

(58) Field of Classification Search .......... 210/167.21, 210/167.26, 219, 416.1, 220, 416.2, 189.1, 210/169, 198.1; 119/263
See application file for complete search history.

(56) References Cited

U.S. PATENT DOCUMENTS

| | | | |
|---|---|---|---|
| 3,208,090 A | 9/1965 | Roesel | |
| 5,199,378 A | 4/1993 | Kissick | |
| 5,515,570 A | 5/1996 | Muscroft | |
| 5,778,824 A | 7/1998 | Musgrave | |
| 5,988,109 A | 11/1999 | Rofen | |
| 6,206,978 B1 * | 3/2001 | Tsui | 134/8 |
| D466,259 S | 11/2002 | Wang | |
| 6,634,052 B2 * | 10/2003 | Hanson | 15/220.2 |
| 2004/0031118 A1 * | 2/2004 | Hanson | 15/220.2 |
| 2005/0076851 A1 * | 4/2005 | Allis | 119/261 |

FOREIGN PATENT DOCUMENTS

| | | | |
|---|---|---|---|
| DE | 102004041236 | * | 3/2006 |
| FR | 2604335 | * | 9/1986 |

* cited by examiner

*Primary Examiner*—Fred G. Prince
(74) *Attorney, Agent, or Firm*—Delain Law Office, PLLC; Nancy Baum Delain

(57) ABSTRACT

A fish tank powerhead holding device is taught, the device comprising a first magnetic assembly with a first permanent strong magnet and a non-stick surface adhered to one side, a second magnetic assembly with a second permanent strong magnet that is magnetically attracted to the first magnetic assembly and a non-stick surface adhered to one side, and a commercially available powerhead that is permanently affixed to said first magnetic assembly opposite from said non-stick surface such that the powerhead can be positioned to effectively aerate a fish tank.

16 Claims, 4 Drawing Sheets

FISH TANK POWERHEAD MAGNETIC HOLDER

CROSS-REFERENCE TO RELATED APPLICATIONS

This non-provisional Application claims the benefit of the filing date of Provisional Application No. 60/622,243, filed on 26 Oct. 2004 with the United States Patent and Trademark Office.

BACKGROUND OF THE INVENTION

The following section describes the background of the present invention.

1. Field of the Invention

The invention relates to magnetic placement of fresh- and saltwater fish tank aeration devices.

2. Description of Related Art

Musgrave (U.S. Pat. No. 5,778,824) teaches an aquatic animal feeding assembly for use with aquariums, tanks, pools or the like. The feeding assembly comprises an outer magnet placed adjacent to an outer surface of the aquarium wall and an inner magnet placed opposite the outer magnet on the inner surface of the aquarium wall such that the magnets attract each other against the aquarium wall. A food holder is attached to the inner magnet within the aquarium for releasably holding food within the aquarium. The magnets generate an attractive magnetic force sufficient to hold each other in place opposite the aquarium wall. In addition, the outer magnet may be moved along the aquarium wall to thereby move the inner magnet and the food holder to a desirable location within the aquarium.

Muscroft (U.S. Pat. No. 5,515,570) teaches a tool for wiping windows by means of a ceramic rectangular permanent magnet, or magnets, which has wiper blades attached. This unit is called the slave unit. On the opposite side of the window surface is a ceramic rectangular permanent magnet or magnets, which is called the master unit. When the two units are placed opposite each other across the window surface the magnetic attraction pulls the slave unit wiper blades against the window surface. When the master unit is moved across the window surface, the slave unit follows in unison on the other side and the wiper blades flip-flop wiping the window clear.

Rofen (U.S. Pat. No. 5,988,109) teaches an apparatus for cleaning the inner wall surfaces of an aquarium tank including a pair of magnetic assemblies adapted for mutual magnetic engagement. Both assemblies include an outer housing of waterproof material and a planar surface adapted to impinge on the aquarium walls. A scrubber pad is laminated to at least one planar surface of the assemblies, and a strong permanent magnet is secured within the protective enclosure of each housing. One assembly impinges its scrubber surface on the inner surface of an aquarium wall, and the other assembly is disposed directly adjacent to the inner assembly and in magnetic engagement therewith. Translating movement of the outer assembly causes concomitant movement of the inner assembly, whereby the scrubber surface of the inner assembly is translated across the inner surface of the aquarium wall for cleaning purposes. A float is secured by a line or cord to the magnetic assembly disposed within the aquarium. If the inner assembly disengages from the outer assembly, and falls to the bottom of the aquarium, the float will remain at the surface of the water in the aquarium, and the inner assembly may be retrieved by grasping the float and pulling the line and inner assembly from the water. The float permits the inner assembly to be retrieved without requiring any exposure of the hands or clothing to the aquarium water, and with minimal disturbance to the fish within the aquarium.

Wang (U.S. Pat. No. D466,259 S) teaches an ornamental design for a magnetic cleaning scrap-slab for an aquarium.

Kissick et al. (U.S. Pat. No. 5,199,378) teaches a system and method for filtering waste and debris from an aquarium tank and from the water supply therein without having to empty the tank or remove the fish therefrom. The invention generally includes a movable cleaner positioned adjacent to the bottom surface of the tank so that the movable cleaner dislodges waste and debris deposited thereon and directs the dislodged waste and debris toward an aperture to be conducted away from the bottom surface of the tank. The movable cleaner preferably comprises a barrier structure and moving means preferably comprises mechanical structure positioned externally of the tank. The waste-carrying water may be filtered and then returned to the aquarium or replaced with fresh water.

Roesel (U.S. Pat. No. 3,208,090) teaches a cleander for the inner surface of the walls of an aquarium including a controller and a follower, the follower including a plastic carrying body having a centrally located magnet receiving indentation and end located cleaning element receiving indentations at two sides of the magnet receiving indentation, partitions separating the indentations, a ferrite magnet in the magnet receiving indentations, the magnet being double poled, a metal plate in the magnet receiving indentation and engaging the inner surface of the magnet to complete the magnetic flux path and thereby reduce the magnetic reluctance in the back of the magnet and provide additional magnetic force in the front of the magnet, cleaning sponges of inert material in the cleaning element receiving indentations and having their outer cleaning surfaces extending outwardly of the outer surfaces of the magnet, and glide pins carried by the body and extending outwardly of the outer surface of the magnet and terminating inwardly of the outer surfaces of the cleaning sponges, to prevent contact of the magnet with a surface being cleaned but permit contact of the cleaning sponges with such surface.

To properly aerate a fish tank, the powerhead must be moved approximately every 12 hours between the top and the bottom of the tank. At present, powerheads are commonly held in place against the wall of a fish tank with one or more suction cups. This means the caretaker must insert a foreign object, such as his or her hands or another grasping device, into the water of the tank twice per day to move the powerhead. This can cause contamination of the tank's water with the oils and dirt associated with human hands. This contamination can be harmful to the delicately balanced ecosystem within a fish tank, especially within a saltwater fish tank.

The prior art teaches the use of magnets for use in moving and holding scrubbers and fish feeding devices without the need to insert a foreign object into the fish tank. However, no means of moving a powerhead other than with hands or another grasping device is disclosed. Thus, there is a previously unmet need in the art for a means to move a powerhead within a fish tank without introducing hands or other foreign objects into the ecosystem of the tank.

BRIEF SUMMARY OF THE INVENTION

A fish tank aerating powerhead holder that allows the powerhead to be moved without introducing a foreign object such as a hand into a fish tank is disclosed.

A commercially available fish tank aerating powerhead 10 has a first magnetic assembly 12 affixed 18 thereto. This first magnetic assembly 12 comprises a first permanent strong magnet, not shown, and, in the preferred embodiment, an encasement 22 for the permanent magnet. The first magnetic assembly 12 is fixedly attached 18 to a side of a commercially available powerhead 10 such that the powerhead 10 can fully aerate a fish tank 16 with the first magnetic assembly 12 attached.

A second magnetic assembly 14 comprising magnet encasement 32 in the preferred embodiment, and a second permanent strong magnet, not shown, that is of opposite polarity from the first magnet is placed on the outside wall of the fish tank 16, opposite the first magnetic assembly 12. In this position, the attractive magnetic fields of the first and second magnets cause the magnetic assemblies 12, 14 to adhere to one another across the fish tank wall 16, and hold in place the attached powerhead 10.

A non-stick finishing layer 20,30 made of a durable non-stick material (such as polytetrafluoroethylene), or of a fabric (such as felt), is adhered to the surface of both the first 20 and the second 30 magnetic assemblies that is in actual contact with 5 the fish tank wall 16.

DETAILED DESCRIPTION OF THE INVENTION

Figure 1:
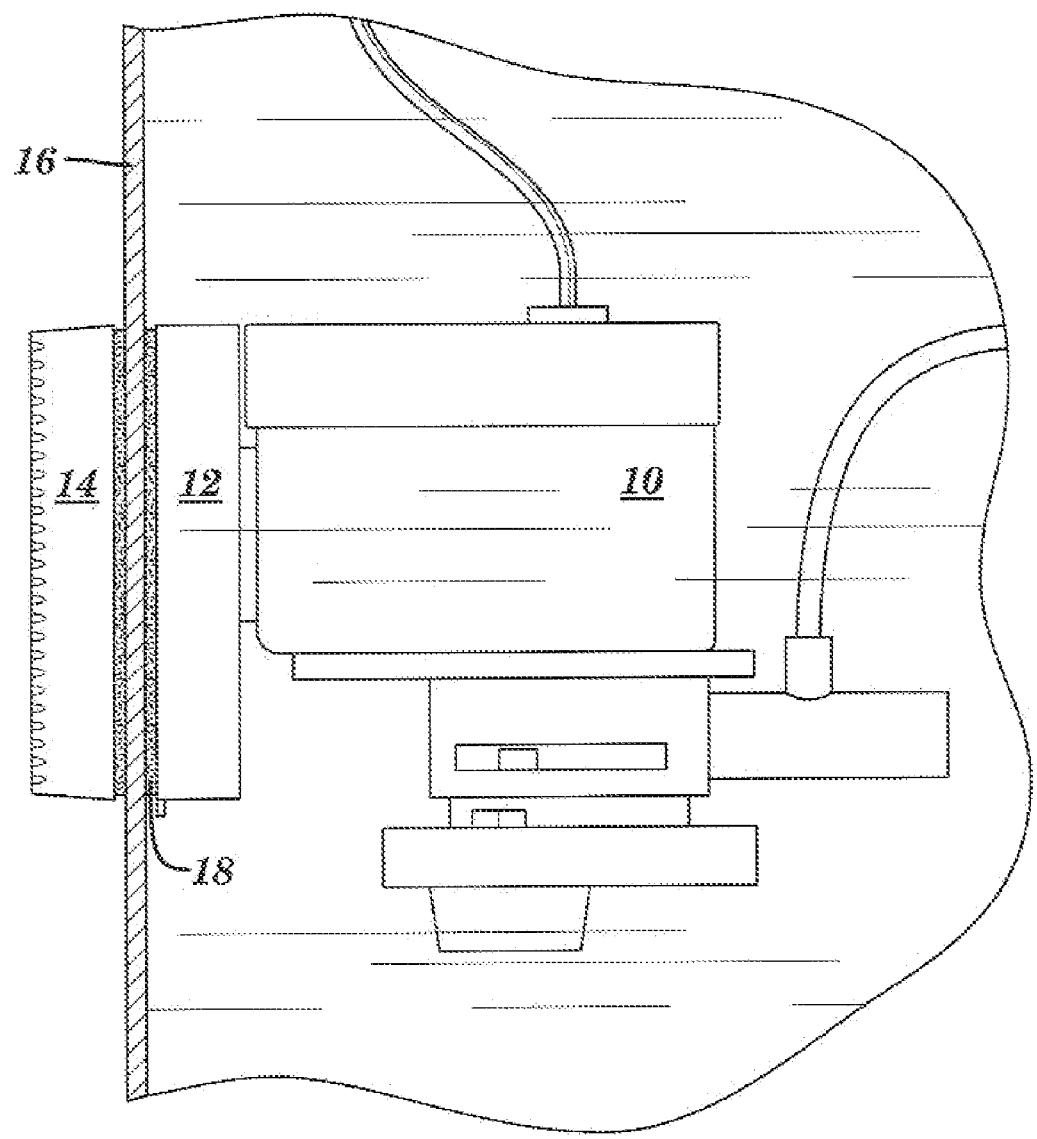
FIG. 1 shows the magnetic powerhead holder working across the glass of a fish tank wall.

Referring now to FIG. 1, a commercially available powerhead 10 is shown with a first magnetic assembly 12 permanently affixed 18 thereto, in such a way that the powerhead 10 is able to fully perform its function of aerating a fish tank 16 with the first magnetic assembly 12 attached. The powerhead 10 and first magnet assembly 12 are located inside a fish tank 16, on a vertical wall 16 of the tank 16.

A second magnetic assembly 14 is also shown. The second magnetic assembly 14 is located on the outside of the fish tank's wall 16, opposite from the first magnetic assembly 12. The second magnetic assembly 14 is a separate unit from the first magnetic assembly 12 and powerhead 10.

The magnet in the first magnetic assembly 12 is of opposite polarity from the magnet in the second magnetic assembly 14.

The second magnetic assembly 14 can easily be moved simply by dragging it across the fish tank wall 16. When the second magnetic assembly 16 is thus moved, the first magnetic assembly 12 is pulled along with it through attractive magnetic force. Because the first magnetic assembly 12 is magnetically captured by the second magnetic assembly 14 and the first assembly 12 is affixed 18 to the powerhead 10, the powerhead 10 is moved without requiring the insertion of a foreign object into the fish tank 16.

Figure 2:
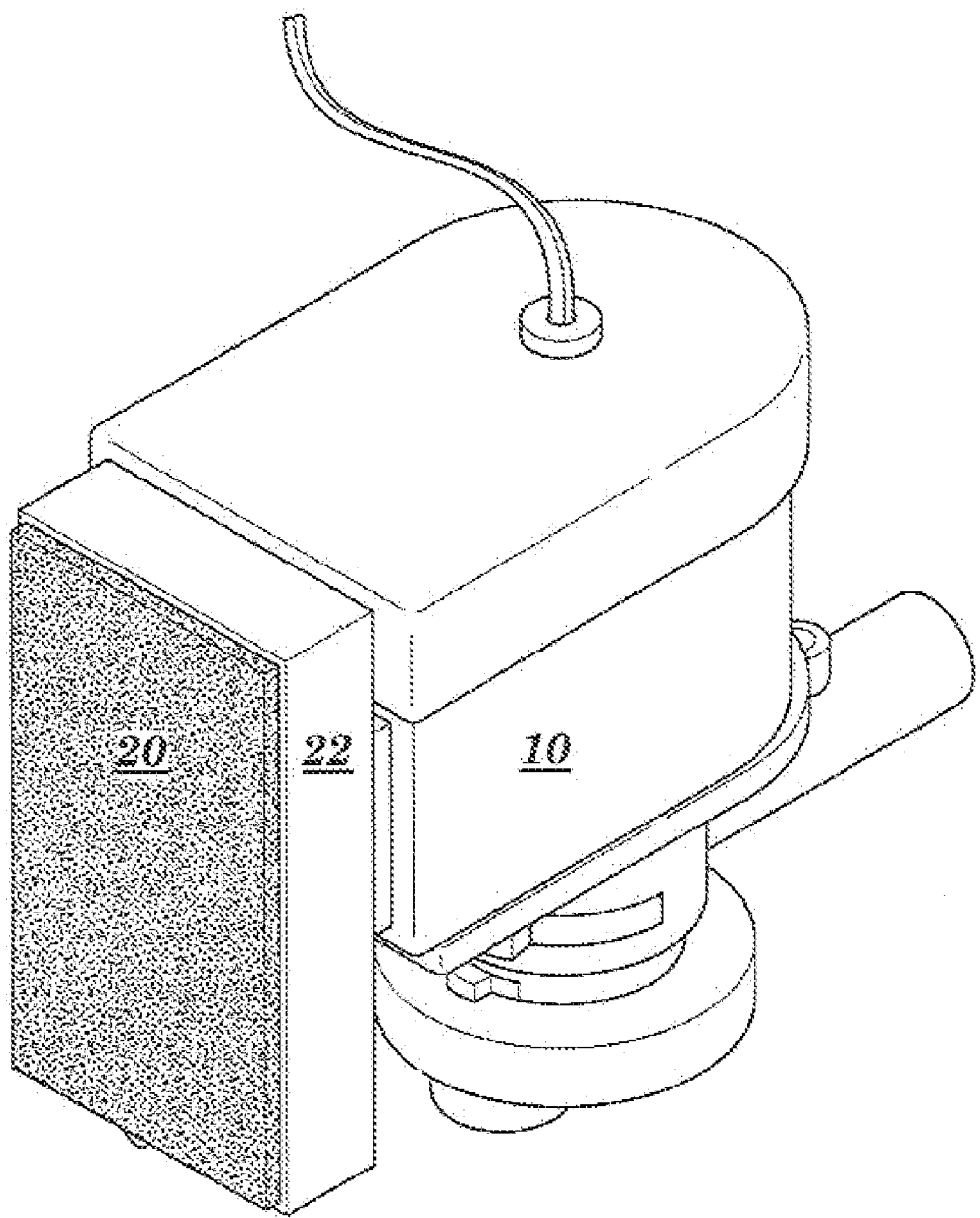
FIG. 2 shows a view of the non-stick surface of the first magnetic assembly.

Referring now to FIG. 2, a durable non-stick finishing layer 20 is adhered to the surfaces of the first magnetic assembly 12 on the side that is in contact with the fish tank wall 16. The non-stick finishing layer 20 comes into actual contact with the fish tank wall 16, and allows the first magnetic assembly 12, with the attached powerhead 10, to be moved along the fish tank wall 16 easily.

The non-stick layer 20 extends across substantially all of the surface area that contacts the fish tank wall 16. The non-stick layer 20 may be comprised of a durable non-stick material (such as polytetrafluoroethylene), or it may be made of a fabric (such as felt).

Figure 3:
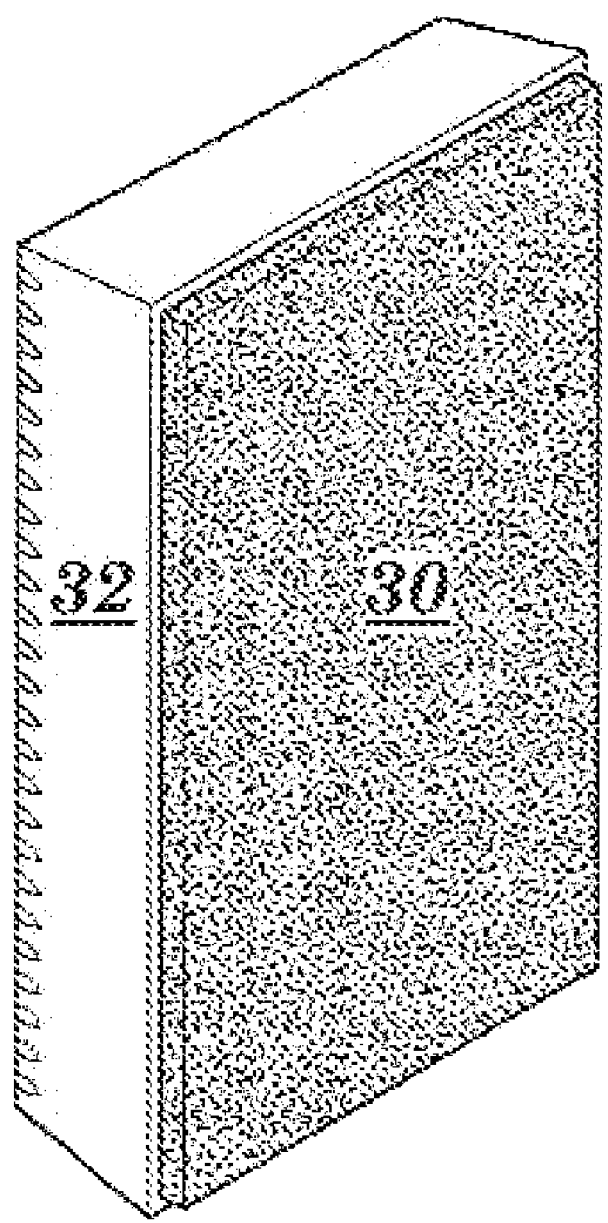
FIG. 3 shows a view of the non-stick surface of the second magnetic assembly.

Referring now to FIG. 3, a durable non-stick finishing layer 30 is adhered to the surfaces of the second magnetic assembly 14 on the side that is in contact with the fish tank wall 16. The non-stick finishing layer 30 comes into actual contact with the fish tank wall 16, and allows the second magnetic assembly 14 to be moved along the fish tank wall 16 easily.

The non-stick layer 30 may be comprised of a durable non-stick material (such as polytetrafluoroethylene), or it may be made of a fabric (such as felt).

Figure 4:
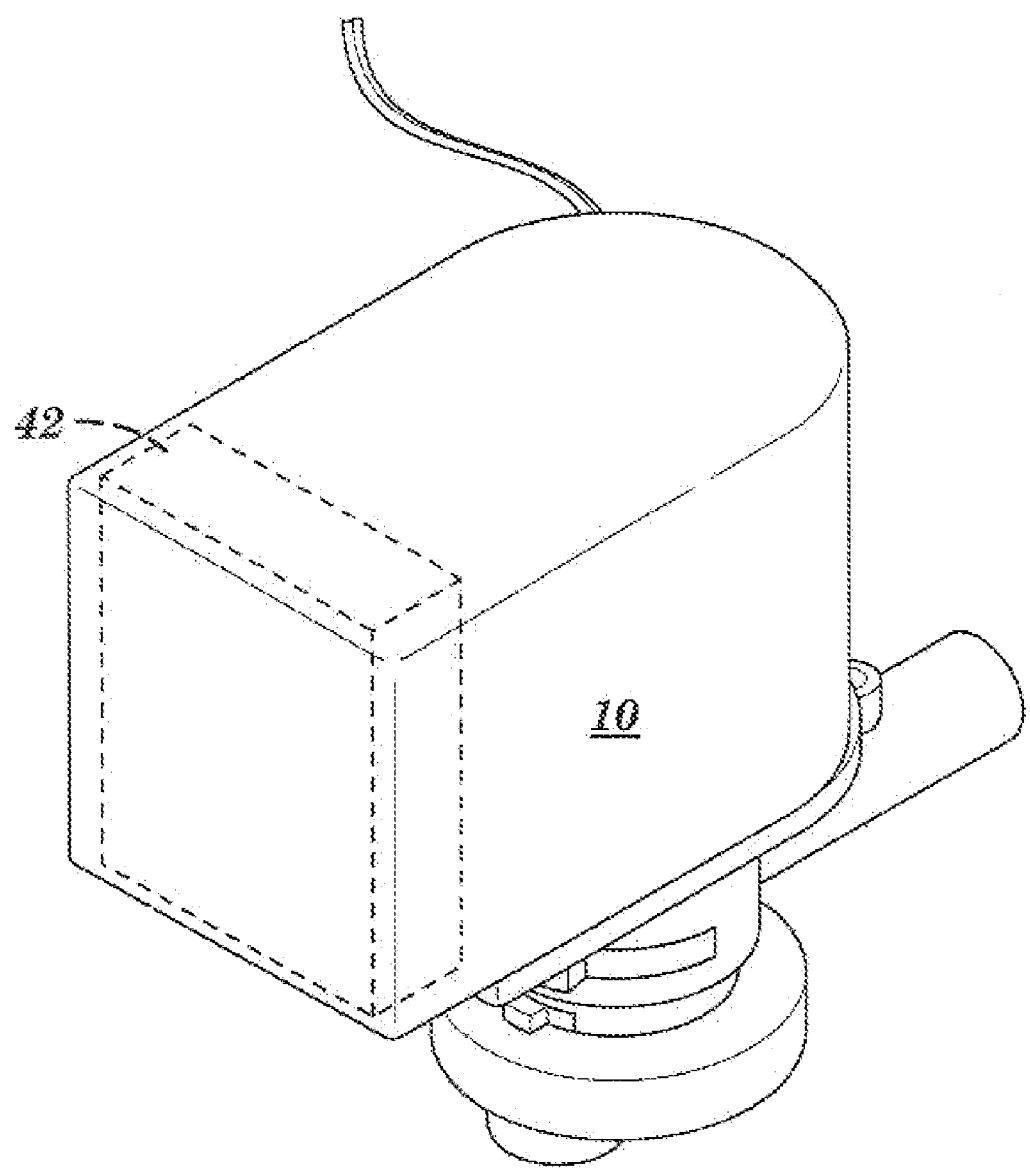
FIG. 4 shows a view of the magnetic powerhead holder with a first magnet encased within the powerhead.

Referring now to FIG. 4, a powerhead 10 containing a first magnet 42 within the powerhead 10 is shown.

In an alternate embodiment, the surfaces of the first 12 and second 14 magnetic assemblies that are in contact with the fish tank wall 16 may be adapted for scrubbing the wall 16 as the powerhead 10 is moved. Such an embodiment would replace the non-stick finishing layer 20, 30 with a scrubbing layer, not shown, affixed to the surface of at least the first magnetic assembly 12 that is in contact with the fish tank wall 16. A scrubbing layer may be affixed to both magnetic assemblies 12, 14 within the scope of this embodiment, or the second magnetic assembly 14 may retain its non-stick finishing layer 30.

Each magnetic assembly 12, 14 comprises a powerful permanent magnet, not shown. Each magnet in the current embodiment has an encasement 22, 32 made of a durable, watertight material, but the magnet may be exposed in other embodiments.

In the current embodiment the encasement 22, 32 for each of the magnets is comprised of durable plastic, but other materials such as wax, rubber, a non-magnetic metal, or other similar materials are equally possible to use to encase the magnets.

In another alternate embodiment, a float, not shown, may be attached by a line, not shown, to either the powerhead 10 or the first magnetic assembly 12. In this embodiment, if the powerhead 10 should become detached from the outside magnetic assembly 14 and sink to the bottom of the tank 16, the powerhead 10 can be retrieved by pulling on the float and line, thus raising the sunken powerhead 10. This avoids any necessity at all of introducing hands or other foreign objects into the fish tank 16.

While a preferred embodiment is shown and described herein, it should be understood that the present disclosure is made by way of example only and that variations in the described device and its uses are possible within the scope of this disclosure without departing from the subject matter coming within the scope of claims to be examined, and a reasonable equivalency thereof, which I regard as my invention.

What is claimed is:

1. A fish tank powerhead holding device comprising:
    a first magnetic assembly comprising a first permanent strong magnet and a non-stick surface adhered to one side;
    a second magnetic assembly comprising a second permanent strong magnet that is of opposite polarity from said first magnet and a non-stick surface adhered to one side; and a commercially available powerhead comprising a body, permanently affixed to said first magnetic assembly opposite from said non-stick surface such that said powerhead can be positioned to function effectively as an aerating device within a fish tank.

2. The fish tank powerhead holding device of claim 1 further comprising said first magnetic assembly also comprising an encasement for said first magnet.

3. The fish tank powerhead holding device of claim 2 further comprising said first magnet encasement being made of a material selected from the group consisting of wax, rubber, non-magnetic metal, and sturdy plastic.

4. The fish tank powerhead holding device of claim 1 further comprising said second magnetic assembly also comprising an encasement for said second magnet.

5. The fish tank powerhead holding device of claim 4 further comprising said second magnet encasement being made of a material selected from the group consisting of wax, rubber, non-magnetic metal, and sturdy plastic.

6. The fish tank powerhead holding device of claim 1 further comprising said non-stick surface being made of a durable material.

7. The fish tank powerhead holding device of claim 6 further comprising said non-stick durable material being polytetrafluoroethylene.

8. The fish tank powerhead holding device of claim 1 further comprising said non-stick surface being made of a fabric.

9. The fish tank powerhead holding device of claim 8 further comprising said fabric being felt.

10. The fish tank powerhead holding device of claim 1 further comprising said first magnetic assembly being encased within said body of said powerhead.

11. A fish tank powerhead holding device comprising:
a commercially available powerhead;
a first magnetic assembly permanently affixed to said powerhead such that said powerhead can be positioned to effectively aerate a fish tank, said first magnetic assembly comprising a first permanent magnet strong enough to hold said powerhead in place, a sturdy encasement for said first magnet, and a durable non-stick surface adhered to one side of said first magnetic assembly such that said non-stick surface slidingly contacts an inside of a wall of a fish tank; and
a second magnetic assembly comprising a second permanent magnet that is of opposite polarity from said first magnet and is strong enough to work with said first magnet to hold said powerhead in place, and a sturdy encasement for said second magnet, with a durable non-stick surface adhered to one side of said second magnetic assembly such that said non-stick surface slidingly contacts an outside of said wall of said fish tank.

12. The fish tank powerhead holding device of claim 11 further comprising said first magnet encasement being made of a material selected from the group consisting of wax, rubber, non-magnetic metal, and sturdy plastic.

13. The fish tank powerhead holding device of claim 11 further comprising said second magnet encasement being made of a material selected from the group consisting of wax, rubber, non-magnetic metal, and sturdy plastic.

14. The fish tank powerhead holding device of claim 11 further comprising said first magnetic assembly being encased within said body of said powerhead.

15. A fish tank powerhead holding device comprising:
a commercially available powerhead comprising a body;
a first magnetic assembly permanently affixed to said powerhead such that said powerhead can be positioned to effectively aerate a fish tank, said first magnetic assembly comprising a first permanent magnet strong enough to hold said powerhead in place, a sturdy plastic encasement for said first magnet, and a durable non-stick surface adhered to one side of said first magnetic assembly such that said non-stick surface slidingly contacts an inside of a wall of a fish tank; and
a second magnetic assembly comprising a second permanent magnet that is of opposite polarity from said first magnet and is strong enough to work with said first magnet to hold said powerhead in place, and a sturdy plastic encasement for said second magnet, with a durable non-stick surface adhered to one side of said second magnetic assembly such that said non-stick surface slidingly contacts an outside of said wall of said fish tank.

16. The fish tank powerhead holding device of claim 15 further comprising said first magnetic assembly being encased within said body of said powerhead.

* * * * *